G. R. WADSWORTH.
MOTOR DRIVEN VEHICLE.
APPLICATION FILED AUG. 24, 1912.
1,097,954.
Patented May 26, 1914.
2 SHEETS—SHEET 1.
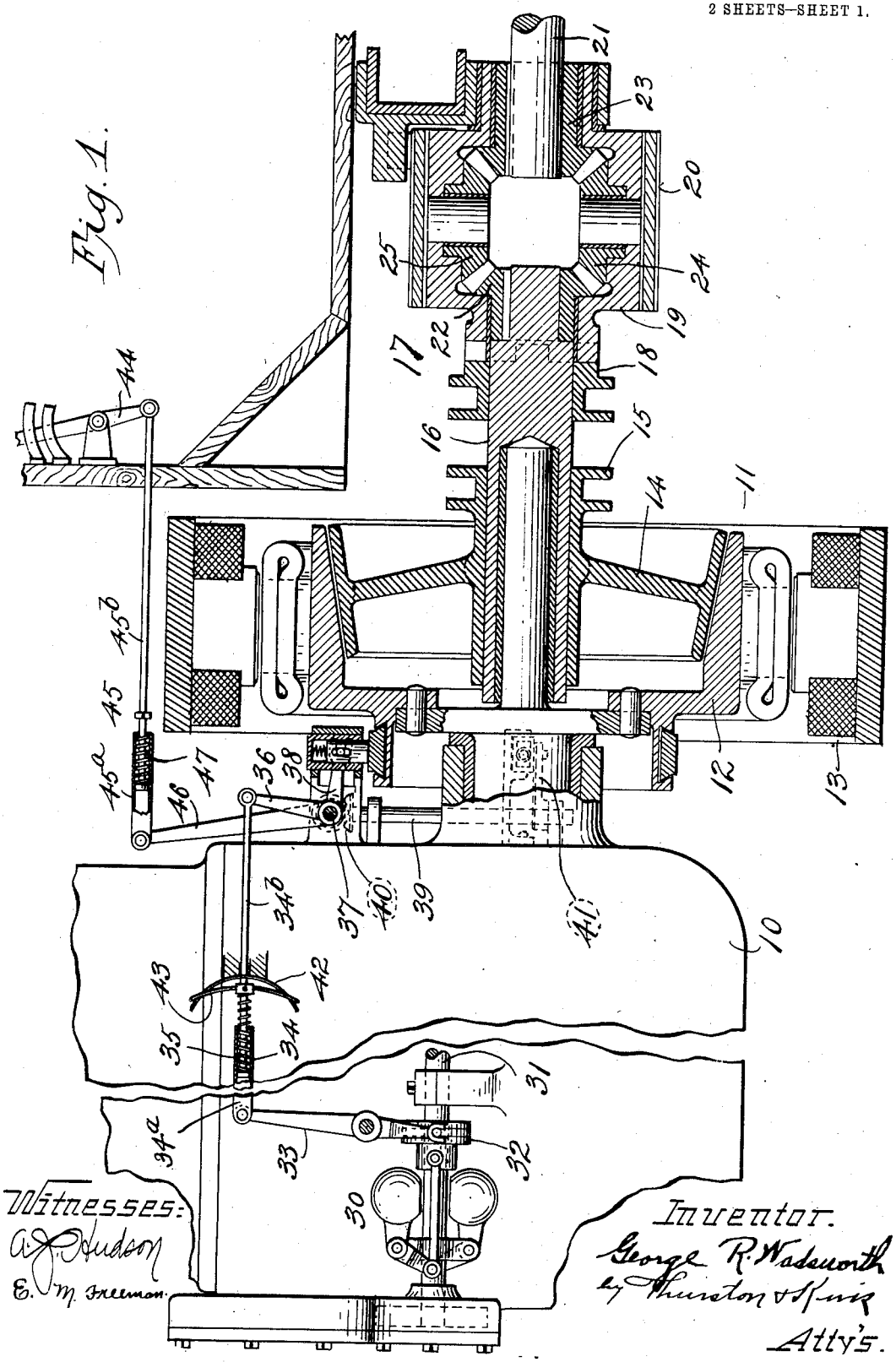

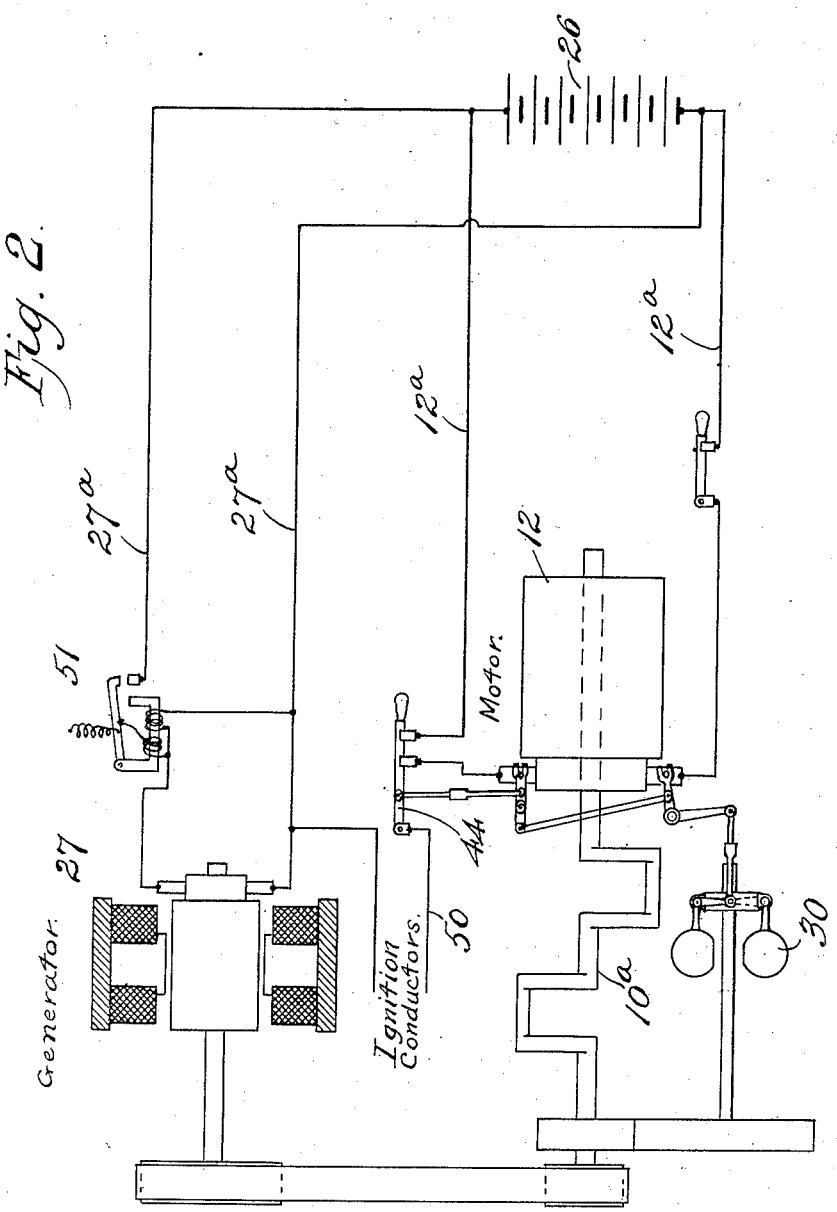

UNITED STATES PATENT OFFICE.

GEORGE R. WADSWORTH, OF CLEVELAND, OHIO, ASSIGNOR TO THE PEERLESS MOTOR CAR COMPANY, OF CLEVELAND, OHIO, A CORPORATION OF OHIO.

MOTOR-DRIVEN VEHICLE.

1,097,954.  Specification of Letters Patent.  Patented May 26, 1914.

Application filed August 24, 1912. Serial No. 716,816.

*To all whom it may concern:*

Be it known that I, GEORGE R. WADSWORTH, a citizen of the United States, residing at Cleveland, in the county of Cuyahoga and State of Ohio, have invented a certain new and useful Improvement in Motor-Driven Vehicles, of which the following is a full, clear, and exact description.

This invention relates to motor driven vehicles.

It is a well known fact that the torque curve of a gasolene motor or engine rises sharply from zero at zero revolutions per minute to a speed corresponding to about ten per cent. of the maximum number of revolutions of the engine. Thus below a certain speed of the engine, which speed may be predetermined, the torque of the motor or its power to propel the vehicle falls off rapidly. Hence the universal practice is to interpose between the engine and rear axle what is known as the transmission gearing or speed change gearing which performs the function of multiplying the gasolene engine revolutions, when compared to rear wheel revolutions, and so maintains the engine at such a speed of operation that there is proper torque to propel the car.

One of the objects of my invention is to eliminate entirely the necessity for the change speed gearing, which, as above stated, is introduced on account of the inherent drooping characteristic in the torque curve of the engine as the engine speed decreases.

Further the invention aims to provide in conjunction with the engine for engine starting purposes and for vehicle propelling purposes an electric motor which may be termed a compensating motor, which at a certain engine speed will be cut into service to assist the engine to propel the vehicle, and will be cut out of service when the engine speed is such that the engine has sufficient torque to propel the vehicle without the assistance of the motor. The electric motor at low speed revolutions per minute produces its maximum torque or during the interval when the torque of the gasolene engine is least or is decreasing the torque of the electric motor is highest or is increasing. As the electric motor, by virtue of its characteristic torque curve, compensates for the falling off in torque of the gasolene engine at low speeds, with the electric motor acting in conjunction with the gasolene engine, there may be produced a substantially flat torque curve.

A still further object is to provide automatic means whereby the power of the electric motor is applied so as to act in conjunction with that of the gasolene engine when the power of the motor is required, and is also cut out of service when its power is no longer needed for efficient operation, the motor being automatically connected to and disconnected from a battery which may be charged by a separate electric generator which can be driven constantly by the engine when the latter is in operation.

The above and other features constitute my invention, which may be here briefly summarized as consisting in certain novel combinations and arrangement of parts which shall be described in the specification and set forth in the appended claims.

In the drawings, wherein I have shown my invention somewhat conventionally, Figure 1 is a side elevation partly in section of the principal parts of my improved system of propulsion, the same being applied to a motor vehicle, only a portion of which is shown. Fig. 2 is a diagrammatic view illustrating chiefly the electrical connections between the battery, the compensating motor, and the generator, and showing conventionally the manner in which the connections are made and broken.

Referring to the drawings, 10 represents a gasolene engine for vehicle driving purposes, which engine may be of any suitable construction. The electric motor which is preferably a series motor is arranged just at the rear of the engine, and the rotor or rotating armature 12 of the motor which is supported upon an extension or continuation of the crank shaft 10ª of the engine is made sufficiently heavy to serve as the engine fly wheel. The armature coöperates with a stationary field member 13 which may be attached in any suitable manner to the chassis frame.

The usual clutch employed with motor driven vehicles is preferably mounted within the limits of the motor, and in this case the annular rotor frame serves as a female clutch member which coöperates with a male clutch member 14, which together with the clutch ring 15 is slidably mounted upon a shaft 16 coaxially arranged with reference to the shaft or the shaft extension upon which the armature is mounted. A second clutch designated as a whole by the reference character 17 is preferably employed in conjunction with the main clutch,—the second clutch 17 being utilized for reversing purposes. As the construction of this reversing mechanism is not new with me merely a brief description and illustration is thought to be necessary. This clutch 17 includes an axially shiftable clutch member 18 slidable upon but rotatable with the shaft 16 and having clutch teeth or jaws which coöperate with and are adapted to interlock with the jaws of a member 19 which rotates with the shaft 16 when the clutch 17 is in, and is held against movement by a suitable clutch band 20 when the clutch 17 is out and when the vehicle is reversed. In coaxial arrangement with the shaft 16 is the shaft 21 which is locked to and driven with the shaft 16 when the clutch 17 is in, and which is driven in the reverse direction with respect to the rotation of the shaft 16 when the clutch 17 is out. Keyed to the end of shaft 16 within the member 19 is a bevel gear 22, and keyed to the shaft 21 is a similar bevel gear 23. The member 19 carries a pair of bevel gears 24 and 25, which are arranged between the gears 22 and 23 and mesh with the same. When the clutch 17 is in and the member 19 is caused to rotate with the shaft 16 the gears are locked against movement, and the shafts 16 and 21 are driven in unison or as a single shaft, but when the clutch 17 is out and the member 19 is held against rotation by the band 20, the rotation of the shaft 16 is transmitted to the shaft 21 through the bevel gearing which causes the reversal of rotation of the shaft 21. This shaft 21, as will be understood, extends to the driving axle or shaft which may, of course, be a jack shaft or the axle or axle sections upon which the rear wheels are mounted.

The motor is supplied with current to start the engine or for vehicle propulsion purposes, from a storage battery 26 which is connected to the motor by conductors 12ª, and for the charging of this battery I prefer to employ a separate electrical unit consisting of a generator 27 which may be permanently connected to the engine so as to be driven at all times when the engine is in operation.

The two separate electrical units are preferred to a combined motor-generator unit for numerous reasons. In the first place it is difficult to attain a high degree of electrical efficiency per pound of material employed in construction in a combined motor generator unit, when the specifications require generating functions up to one-half or one horse-power, and motoring functions up to five to ten horse-power, whereas, with separate generating and motoring units much higher efficiency can be obtained per unit of weight employed. Furthermore, the mounting of the usual clutch employed with motor driven vehicles within the limits of the armature of the motor, involves a commutator of quite large diameter, and this entails a high peripheral speed of the commutator. The recognized difficulty of commutation at high peripheral speeds in a motor generator with generating and motoring functions, substantially as outlined above, together with undesirable operating conditions involving dirt, dust and grease and also the comparatively low efficiency of the motor-generator unit renders advisable the use of a motor separate from the generator.

An important feature of my invention in the system described above resides in the control of the motor,—that is in establishing and breaking electrical connection between the battery and motor. This in accordance with my invention is done automatically and involves automatic switching apparatus controlled by the speed of the engine for connecting and disconnecting under certain speed conditions the motor and battery.

A still further feature of my invention resides in mechanism for raising the brushes of the motor from the commutator when the motor is not required to function as a motor, and for lowering the brushes into contact with the commutator when the motor is to function as a motor to assist the engine in propulsion purposes. For the purpose of simplification I have combined the motor and battery switching mechanism with the brush raising and lowering mechanism, and have provided means dependent upon the speed of the engine for automatically lowering or raising the brushes and utilize this mechanism as the switching mechanism for connecting and disconnecting the battery and motor. This obviates the necessity of an independent and more or less complicated switch and maintains the brushes and commutator mechanically and electrically inert and free from deteriorating action (such as would result from continuous engagement of the commutator and brushes) except at such predetermined times when the power of the electric motor is necessary for propelling the vehicle alone, or in conjunction with the gasolene engine, or for the purpose of starting the gasolene engine as above outlined.

While it will be apparent that to carry out the ideas above outlined various mechanical or electrical expedients may be employed, I utilize for raising and lowering the brushes and for connecting and disconnecting the motor and battery a ball governor, which is designated as a whole by the reference character 30, and may be mounted upon any suitable rotating part of the mechanism. In this case the governor is mounted upon a shaft 31, which corresponds to the ordinary pump shaft of the engine and will be geared to the crank shaft thereof, as will be understood.

The balls of the governor are connected to a sliding sleeve 32 which is connected by a lever 33 to a link 34 composed of two telescopic parts 34ª and 34ᵇ yieldingly or flexibly connected by a spring 35. The link 34 is connected to an arm 36 fixed to a shaft 37 having secured to it a brush raising and lowering arm or fork 38 which is connected to the brush, or, in this case, to the movable brush holder, so as to raise and lower the brush and its holder when the shaft 37 is rocked. This shaft 37 and the fork 38 raises and lowers one of the brushes. The other brush may be similarly actuated from the shaft 37 in numerous ways. In this case I have shown a second shaft 39 which may be connected to the shaft 37 through bevel gearing 40, and this second shaft 39 has a fork or arm 41 which raises and lowers the second brush, which, in this case, is displaced ninety degrees from the brush which is actuated by the fork 38. It will be understood that through the gearing 40 the same movement is imparted to the shaft 39 as is given to the shaft 37. I employ in conjunction with this mechanism a simple form of mechanism for imparting the quick make and break to the brushes and commutator. This includes a rather stiff bowed spring 42 which is connected to the ends of a flexible strip of metal 43 connected at its middle point to the part 34ᵇ of the link 34. The bowed spring 42 will bow the strip 43 outwardly or inwardly very quickly, and hence shift the link part 34ᵇ quickly when the middle part of the strip 43 passes to one side or the other of the dead center. I have also provided in conjunction with this mechanism means whereby the brushes may be raised and lowered by hand. This includes the lever of a hand switch 44 connected by a link 45 to an arm 46 fixed to the shaft 37. Link 45 is composed of two telescopic parts 45ª and 45ᵇ flexibly or yieldingly connected by a spring 47. The switch lever when closed connects the motor to the battery and connects into service the battery ignition system. In Fig. 2 is illustrated the manner in which the switch lever, when actuated to lower the brushes (assuming that they are not already lowered) closes one of the conductors 50, extending from the battery or generator to the ignition coil, and also closes the circuit between the battery and motor. When the switch 44 is opened, of course both the engine and motor are stopped or thrown out of service.

The motor may be used to start the engine, or, in fact, the engine and vehicle, in case the switch 44 is closed, when the main clutch is in. After the engine is operating under its own power and the speed reaches a predetermined value, the motor is disconnected from the battery by the governor and the brush lifting mechanism operated thereby. During normal operation of the engine when the engine is slowed down to a certain predetermined speed, the governor and the brush shifting mechanism automatically closes the circuit between the battery and motor by lowering the brushes unto the commutator, causing the motor to assist the engine in driving the vehicle. When the speed picks up to the predetermined point the motor is again cut out, as previously described.

With the system which I have described above, the motor may be employed to start the engine when the main clutch is thrown out, or when the main clutch is in, the motor may simultaneously start the engine and vehicle. Secondly, the motor will assist the engine in propelling the vehicle, as described, or in case the engine is inert the motor may alone drive the vehicle.

When the engine speed is low and the generated voltage of the generator is less than the voltage of the battery, the generator-battery circuit will be broken by an automatic cut out 51 in one of the conductors 27ª connecting the battery and generator. The automatic cutout 51 may be of any suitable construction. In the present case, I have shown conventionally a cut-out which is operated on the principle of many of the cut-outs in use at the present time,—this cut-out comprising a magnet provided with a series coil and a shunt coil so wound that when the speed of the engine is reduced, so that the current reverses in the series winding, the fields produced by the series and shunt coils are neutralized, permitting a spring to open the cut-out, switch or armature of the magnet, this switch remaining open until the voltage builds up to a point such that the current in the voltage coil produces a field strong enough to close the switch.

Having thus described my invention, what I claim is:

1. In combination, in a motor vehicle, an internal combustion engine, an electric motor associated with said engine so that both the engine and the motor may propel the vehicle, and means controlled by the speed of the engine for causing the motor to assist the engine for propulsion purposes or for deënergizing the motor.

2. In combination in a motor vehicle, an internal combustion engine, an electric motor associated with said engine so that both the engine and motor may propel the vehicle, a battery adapted to supply current to the motor, and automatic switching mechanism operative upon certain speed conditions of the engine for making or breaking the circuit between the motor and battery.

3. In combination, in a motor vehicle, an internal combustion engine, an electric motor having its rotor mechanically connected to the engine so that both the engine and the motor may coact to propel the vehicle, a battery, a generator connected to the engine and to the battery so as to be driven by the engine to charge the battery, and switching mechanism controlled by the speed of the engine for automatically connecting and disconnecting the motor and battery.

4. In combination in a motor vehicle, a drive shaft an internal combustion engine, an electric motor both connected to said drive shaft so that they may coact to propel the vehicle, a battery adapted to be connected to and disconnected from the motor, and means controlled by the speed of the engine for raising the brushes from the commutator of the motor or for lowering the brushes onto the commutator.

5. In combination in a motor vehicle, an internal combustion engine and an electric motor connected together so that both the engine and the motor may propel the vehicle, and so that the engine alone may propel the vehicle, said motor including a commutator and brushes, a battery adapted to be connected to and disconnected from the motor, and mechanism controlled by the speed of the engine for lowering the brushes onto the commutator, or for lifting the brushes from the commutator.

6. In combination in a motor vehicle, an internal combustion engine for driving the vehicle, an engine starting and vehicle driving motor adapted to assist the engine to propel the vehicle when the speed of the engine decreases to a predetermined value, said motor having its rotor mechanically connected to and mounted coaxially with the engine shaft and serving as a fly wheel for the motor, a battery, means for manually connecting and disconnecting the battery and motor, and automatic switching mechanism for connecting and disconnecting the battery and motor, said automatic mechanism being operative upon predetermined speed conditions of the engine.

In testimony whereof I hereunto affix my signature in the presence of two witnesses.

GEORGE R. WADSWORTH.

Witnesses:
A. F. KWIS,
A. J. HUDSON.